(12) United States Patent
Lim

(10) Patent No.: US 7,082,352 B2
(45) Date of Patent: Jul. 25, 2006

(54) TEMPERATURE CONTROL APPARATUS FOR A HEATER USING AN ENCODER SWITCH AND METHOD THEREOF

(75) Inventor: Soo-Hyun Lim, Incheon (KR)

(73) Assignee: Paseco Co. Ltd., Kyonggi-do (KR)

( * ) Notice: Subject to any disclaimer, the term of this patent is extended or adjusted under 35 U.S.C. 154(b) by 126 days.

(21) Appl. No.: 10/784,971

(22) Filed: Feb. 25, 2004

(65) Prior Publication Data
US 2004/0167673 A1    Aug. 26, 2004

(30) Foreign Application Priority Data
Feb. 25, 2003 (KR) ............... 10-2003-0011793
Feb. 10, 2004 (KR) ............... 10-2004-0008619

(51) Int. Cl.
*G05D 23/00* (2006.01)

(52) U.S. Cl. ............... 700/276; 700/278; 700/300; 165/253

(58) Field of Classification Search ............... 700/276, 700/278, 299, 300; 165/238, 253, 259; 236/1 C, 236/1 H, 101 C
See application file for complete search history.

(56) References Cited

U.S. PATENT DOCUMENTS

| 4,181,957 | A | * | 1/1980 | Pinckaers | 700/278 |
| 4,235,368 | A | * | 11/1980 | Neel | 236/94 |
| 4,483,388 | A | * | 11/1984 | Briccetti et al. | 165/241 |
| 5,038,851 | A | * | 8/1991 | Mehta | 165/238 |
| 5,224,649 | A | * | 7/1993 | Brown et al. | 236/94 |
| 5,350,114 | A | * | 9/1994 | Nelson et al. | 237/2 A |
| 5,424,554 | A | * | 6/1995 | Marran et al. | 250/554 |
| 5,438,844 | A | * | 8/1995 | Hoglund et al. | 62/155 |
| 5,612,904 | A | * | 3/1997 | Bunting | 702/183 |
| 6,164,374 | A | * | 12/2000 | Rhodes et al. | 165/240 |
| 6,250,382 | B1 | * | 6/2001 | Rayburn et al. | 165/248 |

FOREIGN PATENT DOCUMENTS

| KR | 01825310000 | 12/1998 |
| KR | 20010019389 | 3/2001 |
| KR | 20030006335 | 1/2003 |

* cited by examiner

*Primary Examiner*—Leo Picard
*Assistant Examiner*—Alexander Kosowski
(74) *Attorney, Agent, or Firm*—Mark M. Friedman

(57) ABSTRACT

Disclosed is a temperature control apparatus for a heater using an encoder switch and method thereof that controls an indoor temperature by driving a burner in accordance with a change of an indoor temperature and ventilating heated air indoors. The temperature control apparatus includes an encoder switch converting a user's set temperature value into a digital signal of a predetermined number of bits, a microcomputer for comparing the indoor temperature inputted in real time with the digital set temperature, driving the burner if the indoor temperature is lower than the set temperature by less than a predetermined temperature $T_1$, and stopping the driving of the burner if the indoor temperature is high than the set temperature by more than a predetermined temperature $T_2$, and a display unit for checking and displaying various kinds of error modes occurring while the burner is driven in accordance with a control signal inputted from the microcomputer.

2 Claims, 8 Drawing Sheets

TEMPERATURE CONTROL APPARATUS FOR A HEATER USING AN ENCODER SWITCH AND METHOD THEREOF

BACKGROUND OF THE INVENTION

1. Field of the Invention

The present invention relates to a temperature control apparatus for a heater using an encoder switch and a method thereof, and more particularly, to a temperature control apparatus for a heater using an encoder switch and a method thereof that can maintain a uniform indoor temperature by receiving a user's set temperature through an encoder switch as a digital signal, comparing an indoor temperature inputted in real time with the set temperature, and repeating an on/off operation of a burner according to the result of comparison.

2. Description of the Related Art

Generally, a heater can compulsorily ventilate a heat-exchanged air uniformly inside a whole room in a relatively short time, and thus it has been used for various purposes.

A conventional heater operates in a manner that if a user sets a desired temperature using a temperature setting unit such as a variable resistor, it senses the indoor temperature, and if the sensed temperature is below the set temperature, it starts burning of fuel such as gas, oil, etc., supplied to a burner by operating an igniter and ventilates hot air by operating a fan motor to heighten the indoor temperature.

However, since the conventional heater adopts an analog type temperature setting unit using a variable resistor, it has drawbacks in that it cannot perform an accurate temperature control due to the limitations and error (about 20%) in setting the temperature.

Also, since the conventional header is not provided with a temperature display unit for displaying the indoor temperature in real time, a separate thermometer should be provided in order for the user to confirm the present indoor temperature or to control the temperature accurately.

SUMMARY OF THE INVENTION

The present invention is directed to a temperature control apparatus for a heater using an encoder switch and a method thereof that substantially obviates one or more problems due to limitations and disadvantages of the related art.

It is an object of the present invention to provide to a temperature control apparatus for a heater using an encoder switch and a method thereof that can maintain a uniform indoor temperature by receiving a user's set temperature through an encoder switch as a digital signal, comparing an indoor temperature inputted in real time with the set temperature, and repeating an on/off operation of a burner according to the result of comparison.

It is another object of the present invention to provide a temperature control apparatus for a heater using an encoder switch and a method thereof that can prevent the heater from being frequently turned on/off and thus protect the heater by setting an operation condition of the heater so that the heater is turned on if the indoor temperature is lower than the set temperature by less than −2° C. and turned off if the indoor temperature is higher than the set temperature by more than 1° C.

It is still another object of the present invention to provide a temperature control apparatus for a heater using an encoder switch and a method thereof that can display the indoor temperature and an abnormal operation mode (e.g., error mode) during the operation of the heater through a temperature display unit that is provided to display the indoor temperature in real time.

It is still another object of the present invention to provide a temperature control apparatus for a heater using an encoder switch and a method thereof that makes it possible to accurately and promptly cope with the error in accordance with the kind of error by classifying and displaying the kind of error during the operation of the heater.

To achieve these objects and other advantages in accordance with the purpose of the invention, as embodied and broadly described herein, there is provided a temperature control apparatus for a heater using an encoder switch that controls an indoor temperature by driving a burner in accordance with a change of an indoor temperature and ventilating heated air indoors, the apparatus comprising an encoder switch converting a user's set temperature value into a digital signal of a predetermined number of bits, a microcomputer for comparing the indoor temperature inputted in real time with the digital set temperature, driving the burner if the indoor temperature is lower than the set temperature by less than a predetermined temperature $T_1$, and stopping the driving of the burner if the indoor temperature is high than the set temperature by more than a predetermined temperature $T_2$, and a display unit for checking and displaying various kinds of error modes occurring while the burner is driven in accordance with a control signal inputted from the microcomputer.

In another aspect of the present invention, there is provided a temperature control method for a heater using an encoder switch that controls an indoor temperature by driving a burner in accordance with a change of an indoor temperature and ventilating heated air indoors, the method comprising the steps of converting a temperature set by a user into a digital signal of a predetermined number of bits through the encoder switch and inputting the digital set temperature, sensing the indoor temperature changed in real time through a thermistor and inputting the sensed indoor temperature; comparing the indoor temperature inputted in real time with the digital set temperature inputted from the encoder switch, and driving the burner if the indoor temperature is lower than the set temperature by less than a predetermined temperature $T_1$; checking and displaying various kinds of error modes occurring while the burner is driven; stopping the driving of the burner if the indoor temperature rising according to the driving of the burner is high than the set temperature by more than a predetermined temperature $T_2$; and maintaining the indoor temperature uniformly with the set temperature by sensing the indoor temperature dropping according to the stop of the driving of the burner, driving the burner if the indoor temperature is lower than the set temperature by less than a predetermined temperature $T_1$, and stopping the driving of the burner if the indoor temperature rising according to the driving of the burner is high than the set temperature by more than a predetermined temperature $T_2$.

The temperature control method may further comprises the steps of the microcomputer determining whether an error occurs by checking the digital signal inputted from the encoder switch; the microcomputer determining whether an error occurs by checking a voltage value inputted from the thermistor, the microcomputer determining whether an error occurs by checking a temperature of the burner rising in accordance with the driving of the burner, and the microcomputer determining whether an error occurs by checking an ignition state of the burner by sensing fire taken in accordance with the driving of the igniter; wherein if it is determined that the error occurs, the microcomputer displays "E1", "E2", "E3" and "E4" as error modes of the encoder switch through a temperature display unit and flickers a power LED.

Additional advantages, objects, and features of the invention will be set forth in part in the description which follows and in part will become apparent to those having ordinary skill in the art upon examination of the following or may be learned by practicing the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings. Wherever possible, the same reference numbers will be used throughout the drawings to refer to the same or like parts.

Hereinafter, the temperature control apparatus for a heater using an encoder switch and the method thereof according to the present invention will be explained with reference to the accompanying drawings.

The basic structure of the heater to which the present invention is applied is well known in the art, and the detailed explanation thereof will be omitted.

Figure 1:
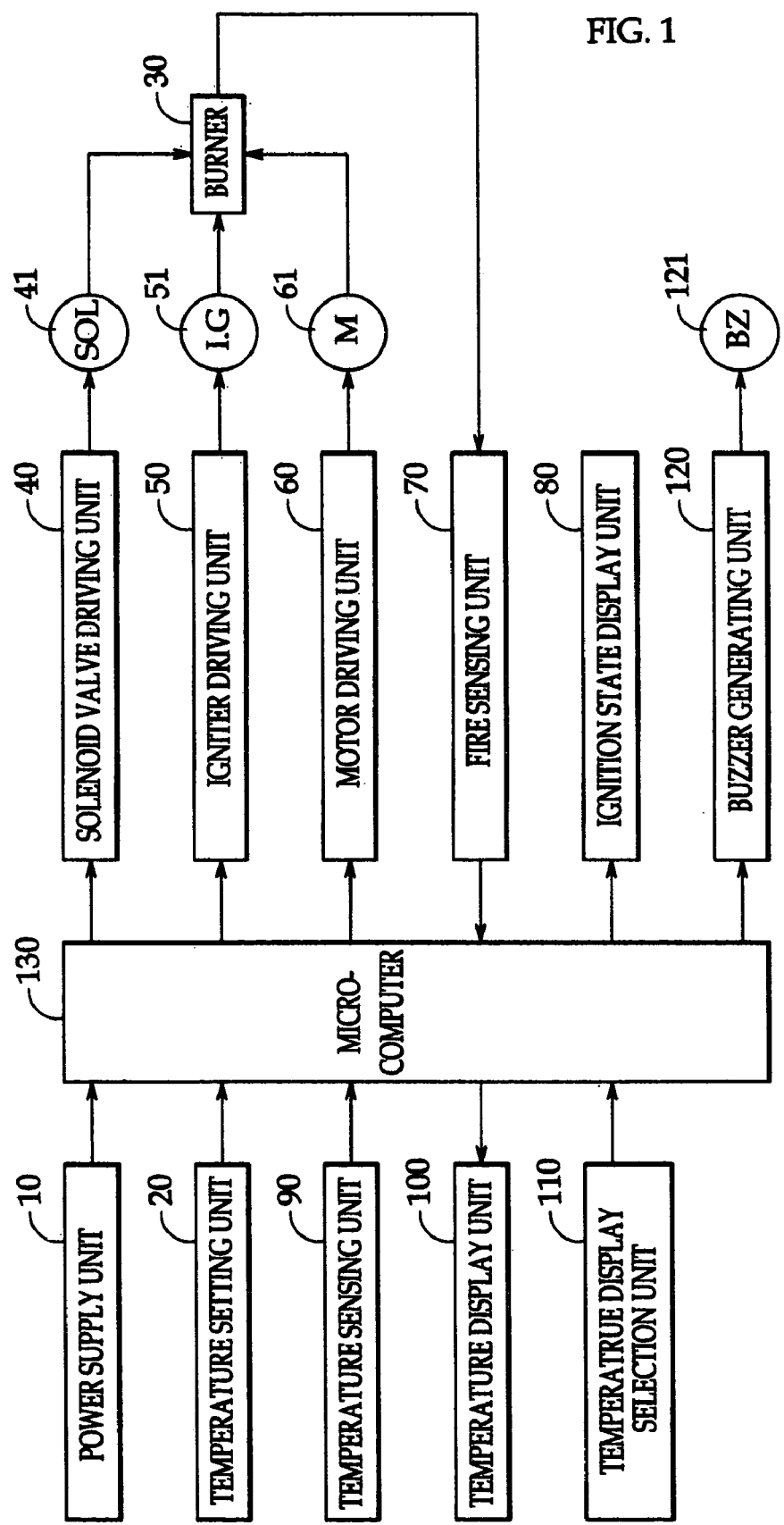
FIG. 1 is a block diagram illustrating a temperature control apparatus for a heater using an encoder switch according to an embodiment of the present invention.
Figure 2:
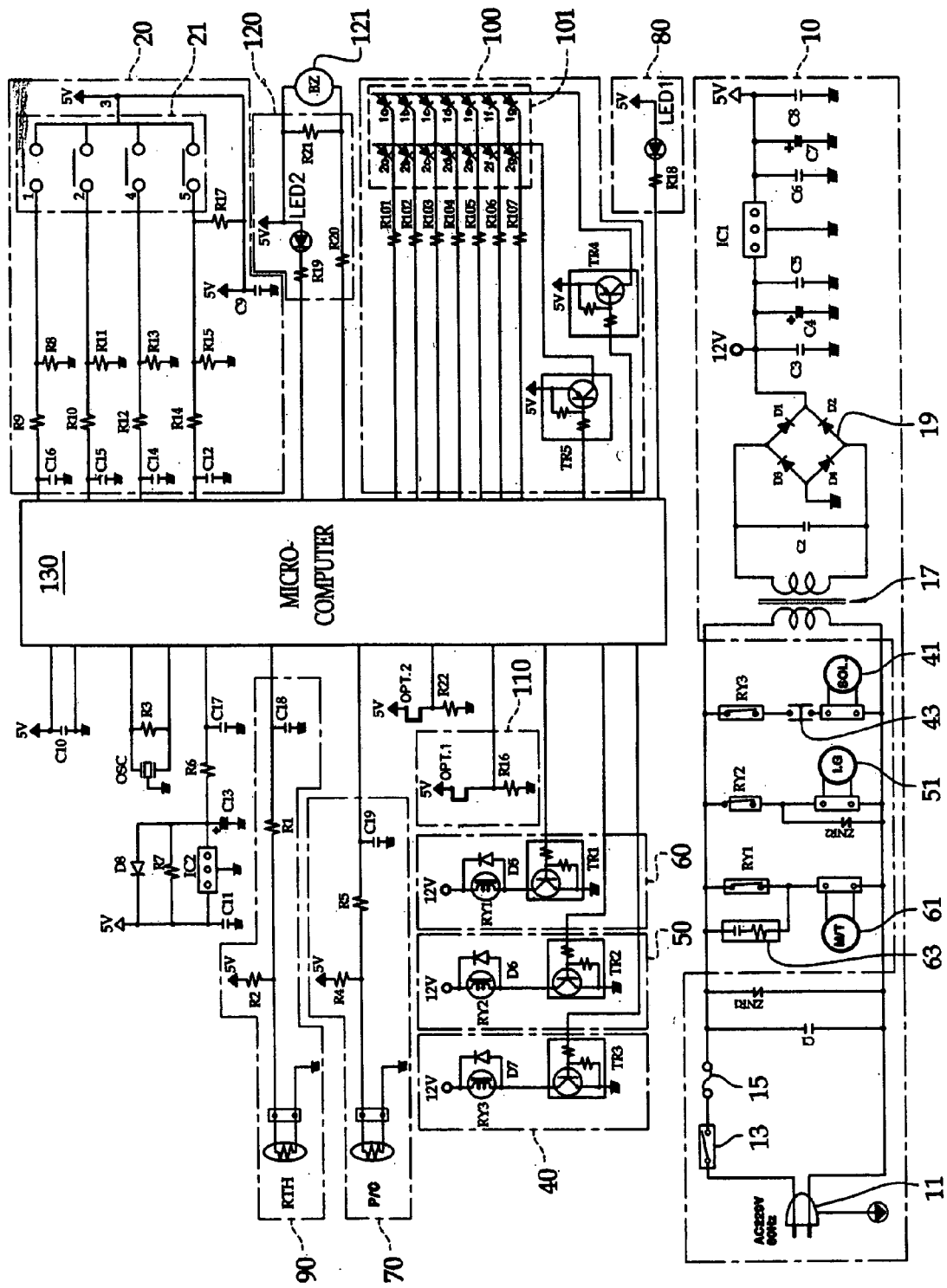
FIG. 2 is a circuit diagram illustrating a temperature control apparatus for a heater using an encoder switch according to an embodiment of the present invention.

FIG. 1 is a block diagram illustrating a temperature control apparatus for a heater using an encoder switch according to an embodiment of the present invention, and FIG. 2 is a circuit diagram illustrating a temperature control apparatus for a heater using an encoder switch according to an embodiment of the present invention.

Referring to FIGS. 1 and 2, the temperature control apparatus according to the present invention includes a power supply unit 10, a temperature setting unit 20, a burner 30, a solenoid valve driving unit 40, an igniter driving unit 50, a motor driving unit 60, a fire sensing unit 70, an ignition state display unit 80, a temperature sensing unit 90, a temperature display unit 100, a temperature display selecting unit 110, an a microcomputer 130.

The power supply unit 10 is provided with a power switch 13 for controlling an on/off operation of an AC power supply provided from a power input terminal 11, a power fuse 15, connected to the power switch 13, for intercepting the power if overcurrent is supplied from the power input terminal 11 or an abnormal current flows from the outside, a capacitor C1, connected in parallel to the power switch 13, for removing a power noise component of the AC power supply inputted from the power input terminal 11, a varistor ZNR1, connected in parallel to the capacitor C1, to intercept overvoltage, a power transformer 17, connected in parallel to the varistor ZNR1, for receiving the AC power supply inputted from the power input terminal 11 to its primary winding, and inducing an AC voltage of a predetermined low voltage on its secondary winding, a smoothing capacitor C2 for removing a noise component contained in the AC voltage induced in the power transformer 17, a bridge rectifier 19 for full-wave-rectifying the AC voltage lowered by the power transformer 17 to output a DC voltage of a predetermined level (for example, 12V), smoothing capacitors C3 to C5, connected to an output terminal of the bridge rectifier 19, for removing a ripple component (i.e., low-frequency component) and a noise component (i.e., high-frequency component) contained in the DC voltage rectified by the bridge rectifier 19, a voltage regulator IC1 for regulating the DC voltage filtered through the smoothing capacitors C3 to C5 to output a constant DC voltage of a predetermined level (for example, 12V), and smoothing capacitors C6 to C8, connected to an output terminal of the voltage regulator IC1, for removing a ripple component and a noise component contained in a constant voltage outputted from the voltage regulator IC1.

The temperature setting unit 20 enables a user to set the indoor temperature to a specified value desired by the user using an encoder switch 21, and is provided with the encoder switch 21 for setting the indoor temperature to a digital value of 4 bits, resistors R8 to R15, connected to the encoder switch 21, for inputting the 4-bit digital signal to the microcomputer 130, capacitors C16, C15, C14 and C12 for stabilizing a potential of the digital signal inputted to the microcomputer 130, and a resistor R17 and a capacitor C9 connected to the encoder switch 21.

For example, if the user sets the indoor temperature to 25 C, this input value of the set temperature is converted into a 4-bit digital signal, and then inputted to the microcomputer 130.

The burner 30 includes a heat-radiating tube for generating combustion heat. The burner is a well-known element of the heater, and thus the detailed explanation thereof will be omitted.

The solenoid valve driving unit 40 controls the driving of a solenoid 41 under the control of the microcomputer 130 so that the solenoid valve supplies or intercepts the supply of fuel contained in a fuel tank (not illustrated) to the burner 30. The solenoid valve driving unit 40 is provided with a transistor TR3 for performing a switching operation according to the control signal outputted from the microcomputer 130, a relay RY3, connected to the transistor TR3, for being driven by the DC voltage (12V) outputted from the power supply unit 10 in accordance with the switching operation of the transistor TR3, and a solenoid valve 41, connectd to the relay RY3, for being driven by the AC power supply from the power input terminal 11 in accordance with the driving of the relay RY3. Also, a voltage dividing resistor for dividing the control signal outputted from the microcomputer 130 is connected to the transistor TR3, and a diode D7 for protecting the relay is connected in parallel to the relay RY3 in order to bypass an inverse electromotive force (EMF) generated during the driving of the relay RY3. A thermostat (e.g., buzzer generating unit 120) is connected between the relay RY3 and the solenoid valve 41. A spark killer 63 absorbs noise generated from the contact of relay RY1.

The igniter driving unit 50 controls the driving of the igniter (ignition transformer) 51 by striking sparks onto the combustion fuel supplied to the burner 30. The igniter driving unit 50 is provided with a transistor TR2 for performing a switching operation according to the control signal outputted from the microcomputer 130, a relay RY2, connected to the transistor TR2, for being driven by the DC voltage (12V) outputted from the power supply unit 10 in accordance with the switching operation of the transistor TR2, and an igniter 51, connected to the relay RY2, for being driven by the AC power supply from the power input terminal 11 in accordance with the driving of the relay RY2. Also, a voltage dividing resistor for dividing the control signal outputted from the microcomputer 130 is connected to the transistor TR2, and a diode D6 for protecting the relay is connected in parallel to the relay RY2 in order to bypass an inverse electromotive force generated during the driving of the relay RY2. A varistor ZNR2 is connected in parallel to the igniter 51.

The motor driving unit 60 drives a fan motor 61 for rotating a fan under the control of the microcomputer 130 so as to exhaust the heated air to the outside as the burner 30 operates and to compress and inject the combustion fuel supplied to the burner 30 as well. The motor driving unit 60 is provided with a transistor TR1 for performing a switching operation according to the control signal outputted from the microcomputer 130, a relay RY1, connected to the transistor TR1, for being driven by the DC voltage (12V) outputted from the power supply unit 10 in accordance with the switching operation of the transistor TR1, and a fan motor 61, connected to the relay RY1, for being driven by the AC power supply from the power input terminal 11 in accordance with the driving of the relay RY1. Also, a voltage dividing resistor for dividing the control signal outputted from the microcomputer 130 is connected to the transistor TR1, and a diode D5 for protecting the relay is connected in parallel to the relay RY1 in order to bypass an inverse electromotive force generated during the driving of the relay RY1. A protection element for controlling a large current (e.g., buzzer generating unit 120) composed of a resistor and a capacitor is connected in parallel to the relay RY1.

The fire sensing unit 70 senses the fire state of the burner 30 taken in accordance with the driving of the igniter 51, and outputs the result of sensing to the microcomputer 130 in order to determine the ignition state of the burner 30. The first sensing unit 70 is provided with a photocell P/C the resistance value of which varies in accordance with the change of the first state, a resistor R4, connected in parallel to the photocell P/C, for outputting a voltage value that varies according to the resistance value of the photocell P/C to the microcomputer 130, a resistor R5, connected to the resistor R4, for outputting a voltage value divided by the resistor R4 and the photocell P/C to the microcomputer 130, and a capacitor C19, connected to the resistor R5, for stabilizing the potential of the voltage signal inputted to the microcomputer 130.

Accordingly, the microcomputer 130 determines that an error occurs if the voltage value that corresponds to the fire state and is inputted from the fire sensing unit 70 deviates from a predetermined reference voltage range, and stops the driving of the burner 30.

The ignition state display unit 80 displays the ignition state of the burner 30 using an LED and so on under the control of the microcomputer 130. If it is determined that an initial ignition fails or the fire state sensed by the fire sensing unit 70 is not normal, the microcomputer 130 alternately outputs high/low-level control signal at predetermined intervals (for example, at intervals of one minute or 0.5 minute). The power LED LED1 receives the high/low-level control signal outputted from the microcomputer 130 through the resistor R18, and flickers at the predetermined intervals (for example, at intervals of one minute or 0.5 minute).

Meanwhile, in the case of the normal combustion, a low-level control signal outputted from the microcomputer 130 is inputted to the power LED LED1 through the resistor R18 to turn on the power LED LED1.

The temperature sensing unit 90 senses in real time the indoor temperature that changes according to the driving of the burner 30, and transfers the sensed temperature to the microcomputer 130. The temperature sensing unit 90 is provided with a thermistor RTH the resistance value of which varies according to the change of the indoor temperature, a resistor R2, connected in parallel to the thermistor RTH, for outputting a voltage value that varies according to the resistance value of the thermistor RTH to the microcomputer 130, a resistor R1, connected to the resistor R2, for outputting a voltage value divided by the resistor R2 and the thermistor RTH to the microcomputer 130, and a capacitor C18, connected to the resistor R1, for stabilizing the potential of the voltage signal inputted to the microcomputer 130.

Meanwhile, another temperature sending unit may sense a burner temperature Tb that changes according to the driving of the burner 30.

The temperature display unit 100 displays the indoor temperature sensed in real time by the temperature sensing unit 90 and inputted to the microcomputer 130. The temperature display unit 100 is provided with a 7-segment type LED module 101 connected to the microcomputer 130 via resistors R101 to R107, and transistors TR4 and TR5, connected to the LED module 101, for driving the LED module 101 in accordance with the control signal received from the microcomputer 130.

The temperature display unit 100, along with the ignition state display unit 80, displays an abnormal state (e.g., error mode) during the operation of the heater, in addition to the display of the indoor temperature.

Specifically, the temperature display unit 100 displays the abnormal states such as the initial ignition failure, error occurrence in the encoder switch 21, error occurrence due to overheat, etc., as error modes (for example, error modes of E1, E2, E3, E4, etc.) that can be recognized by the user.

The temperature display selection unit 110 is for selecting the display of the indoor temperature by either Celsius (C) or Fahrenheit (F). The temperature display selection unit 110 is provided with a resistor R16 for inputting a voltage signal of 5V or 0V to the microcomputer 130, and a display selecting element OPT1, and the microcomputer 130 displays the indoor temperature by either Celsius (C) or Fahrenheit (F) through the temperature display unit 100.

The buzzer generating unit 120 generates a buzzer sound under the control of the microcomputer 130 when the user sets the indoor temperature using the encoder switch 21 or an error occurs in the igniter 51, thermistor RTH, burner 30, encoder switch 21, etc. The buzzer generating unit 120 is provided with a buzzer 121 for receiving the control signal outputted from the microcomputer 130 through resistors R19 and R20 and generating the buzzer sound, and an LED LED2, which is turned on/off in accordance with the control signal inputted from the microcomputer 130 through a resistor R19 during the driving of the buzzer 121.

The microcomputer 130 performs a control operation so as to maintain the indoor temperature in the range of −30° C. to 50° C. by comparing the indoor temperature inputted in real time from the temperature sensing unit 90 with the digital set temperature of 4 bits inputted from the temperature setting unit 20. In order to prevent the load that includes the solenoid valve, the igniter and the fan motor from being frequently turned on/off, the microcomputer 130 performs the control operation in such a manner that if the indoor temperature is lower than the set temperature by more than 2° C., it turns on the load, while if the indoor temperature is higher than the set temperature by more than +1° C., it turns off the load.

Also, in order to control the combustion state of the burner 30, the microcomputer 130 senses the error occurrence caused by the failure of the initial ignition by primarily checking sparks (during the ignition), and senses the error occurrence caused by the incomplete combustion by secondarily checking the resistance value of the photocell that varies corresponding to the change of the brightness of the fire (during the operation). In the case of the error occurrence, the microcomputer 130 controls the buzzer generating unit 120, the ignition state display unit 80 and the temperature display unit 100 to enable the user to promptly cope with the error occurrence.

At this time, if the indoor temperature transferred from the temperature sensing unit 90 becomes lower than the temperature set by the user by more than 2° C., the microcomputer 130 drives the burner 30 by controlling the driving of the solenoid valve 41, the igniter 51 and the fan motor 61. Accordingly, the indoor temperature Tr rises.

Thereafter, if the indoor temperature transferred from the temperature sensing unit 90 becomes higher than the set temperature by more than +1° C., the microcomputer 130 stops the driving of the solenoid valve 41, the igniter 51 and the fan motor 61. Accordingly, the indoor temperature Tr drops.

Hereinafter, the operation of the temperature control apparatus for a heater using an encoder switch as constructed above according to the present invention will be explained.

Figure 3A:
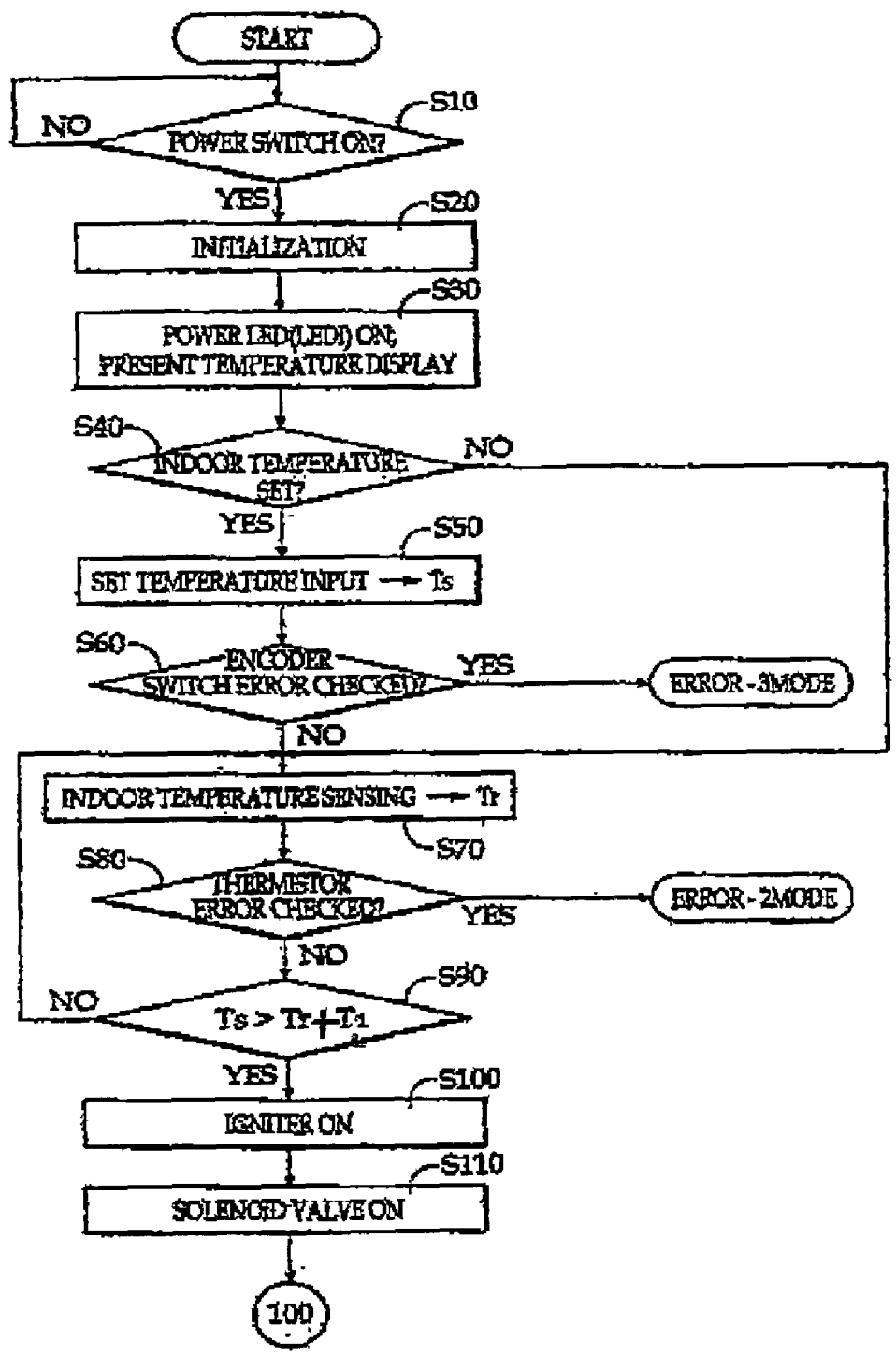
FIGS. 3a and 3b are flowcharts illustrating a temperature control method for a heater using an encoder according to an embodiment of the present invention.
Figure 3B:
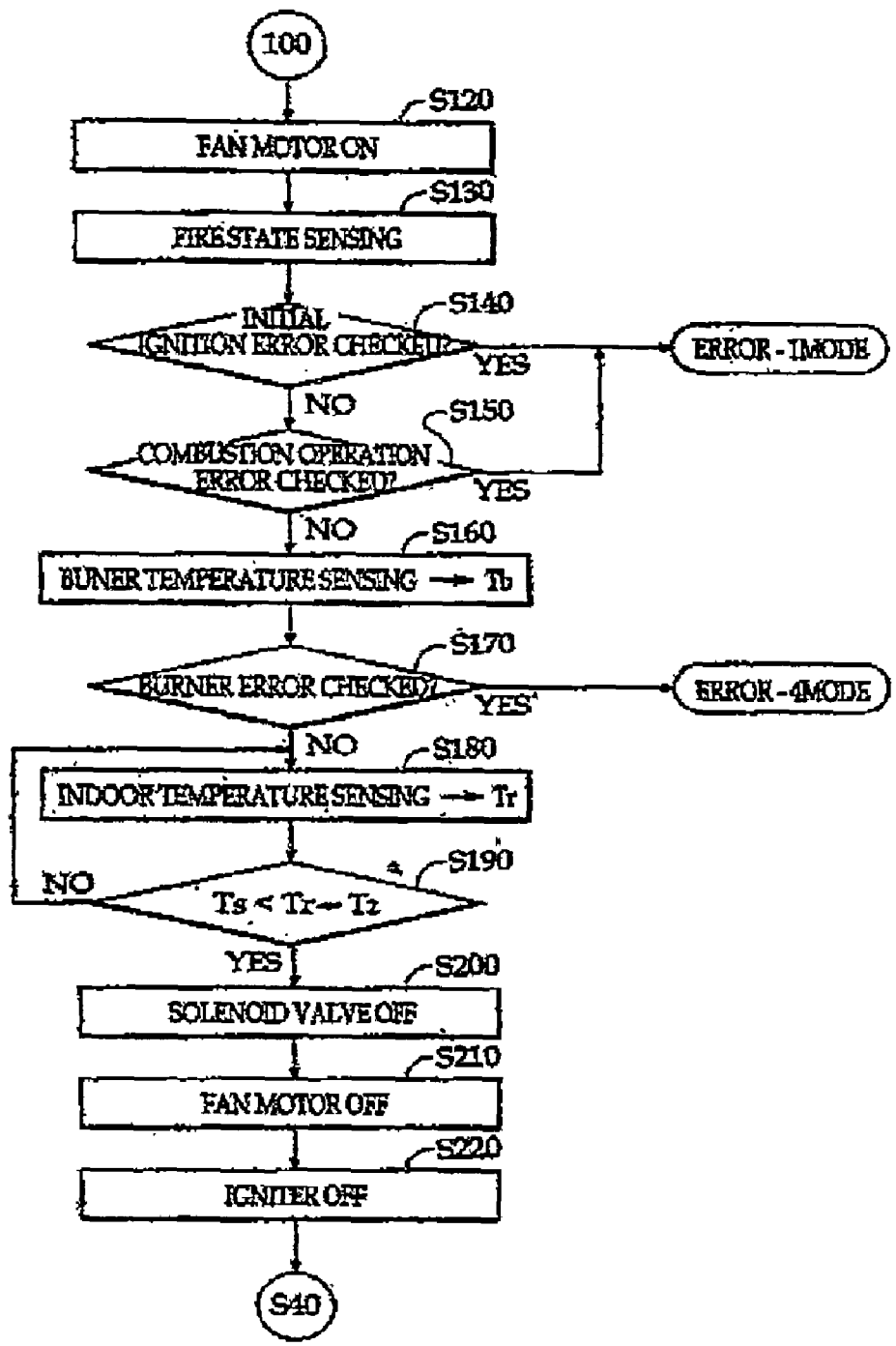

FIGS. 3a and 3b are flowcharts illustrating a temperature control method for a heater using an encoder according to an embodiment of the present invention. In FIGS. 3a and 3b, "S" denotes a step.

First, if the power switch 13 is turned on (S10), the AC power supply (AC220V, 60 Hz) provided from the power input terminal 11 is applied to the primary winding of the power transformer 17, and a specified lowered AC voltage is induced in the secondary winding of the transformer 17.

The AC supply voltage lowered by the power transformer 17 is full-wave-rectified to a specified DC voltage (for example, 12V) through the bridge rectifier 19, and then the rectified DC voltage is filtered through the capacitors C3 to C5 to remove a ripple component and a noise component contained in the rectified DC voltage. (S20)

The DC voltage filtered through the capacitors C3 to C5 is regulated to a constant voltage of 5V through the voltage regulator IC1, and the regulated constant voltage is inputted to the power terminal of the microcomputer 130.

Accordingly, the microcomputer 130 receives the constant voltage signal inputted to its power terminal, initializes the temperature control apparatus of the heater, and then outputs the control signal to the ignition state display unit 80 and the temperature display unit 100.

The low-level control signal inputted from the microcomputer 130 to the ignition state display unit 80 is supplied to the power LED LED1 through the resistor R18, so that the power LED LED1 is turned on. The low or high-level control signal inputted from the microcomputer 130 to the temperature display unit 100 is supplied to the LED module 101 through the resistors R101 to R107, so that the present temperature is displayed (S30).

Thereafter, the user sets the indoor temperature using the rotary encoder switch 21 that is the temperature setting unit 20. At this time, by displaying the temperature value set by the user on the temperature display unit 100, the user can easily set the indoor temperature (S40).

The temperature value set by the user is converted into a 4-bit digital signal by the encoder switch 21, and then inputted to the microcomputer 130 through the resistors R9, R10, R12 and R14.

For example, if the user sets the indoor temperature to 25° C., the input value of the set temperature Ts is converted into the 4-bit digital signal, and then inputted to the microcomputer 130 (S50).

At this time, the microcomputer 130 determines whether an error occurs (in this case, "1111" is inputted) by checking the 4-bit digital signal inputted from encoder switch 21, and if it is determined that the error occurs, the encoder switch 21 enters into an error-3 mode (S60).

If it is determined that the 4-bit digital signal inputted from the encoder switch 21 is normal, the thermistor RTH of the temperature sensing unit 90 senses in real time the resistance value according to the indoor temperature Tr, and inputs the resistance value of the resistor R2 and the thermistor RTH that changes in accordance with the resistance value of the thermistor RTH to the microcomputer 130 to the resistor R1 (S70).

The microcomputer 130 determines whether an error occurs (in this case, "0V" is inputted) by checking the voltage value inputted through the resistor R2 and the thermistor RTH, and if it is determined that the error occurs, the thermistor RTH enters into an error-2 mode (S80).

If it is determined that the voltage value inputted from the thermistor RTH is normal, the microcomputer 130 determines whether the indoor temperature Tr inputted from the temperature sensing unit 90 is lower than the set temperature Ts by more than a predetermined value $T^1$ (for example, 2° C.) by comparing the indoor temperature Tr with the set temperature Ts (S90).

If it is determined that the indoor temperature Tr is not lower than the set temperature Ts by more than the value $T^1$ (for example, 2° C.), the microcomputer 130 returns to step S70, and repeatedly performs the steps following step S70 as it continuously senses the indoor temperature Tr.

Meanwhile, if it is determined that the indoor temperature Tr is lower than the set temperature Ts by more than the value $T^1$ (for example, 2° C.), the microcomputer 130 outputs the control signal to the igniter driving unit 50 to start the combustion operation of the heater.

The high-level control signal outputted from the microcomputer 130 is applied to the transistor TR2 of the igniter driving unit 50 to turn on the transistor TR2, and thus the DC voltage of 12V supplied from the power supply unit 10 is applied to the relay RY2 to turn on the relay RY2.

If the relay RY2 is turned on, the AC power is supplied to the igniter 51 through the relay RY2 to turn on (e.g., drive) the igniter 51, and the high-voltage sparks fly in the burner 30 (S100).

Thereafter, the microcomputer 130 outputs the control signal to the solenoid valve driving unit 40 so as to supply the combustion fuel such as gas, oil, etc., to the burner 30.

The high-level control signal outputted from the microcomputer 130 is applied to the transistor TR3 of the solenoid valve driving unit 40 to turn on the transistor TR3, and thus the DC voltage of 12V is applied to the relay RY3 to turn on the relay RY3.

If the relay RY3 is turned on, the AC power is supplied to the solenoid valve 41 through the relay RY3 to turn on (e.g., drive) the solenoid valve 41, and the fuel is supplied into the burner 30 (S110).

Then, the high-level control signal outputted from the microcomputer 130 is applied to the transistor TR1 of the motor driving unit 60 to turn on the transistor TR1, and thus the DC voltage of 12V is applied to the relay RY1 to turn on the relay RY1.

If the relay RY1 is turned on, the AC power is supplied to the fan motor 61 through the relay RY1 to turn on (e.g., drive) the fan motor 61, and the fuel being compressed and injected into the burner 30 is ignited through the igniter 51 (S120).

At this time, the photocell P/C of the fire sensing unit 70 senses the resistance value that varies in accordance with the fire state of the burner during the ignition operation of the igniter 51, and outputs the resistance value of the resistor R4 and the photocell P/C that varies according to the resistance value of the photocell P/C to the microcomputer 130 through the resistor R5 (S130).

The microcomputer 130 determines whether an error occurs (for example, whether the value of 100 ms is inputted more than three times for 5 seconds) by checking the voltage value inputted through the resistor R4 and the photocell P/C, and if it is determined that the error occurs, the microcomputer 130 enters into an error-1 mode due to the failure of the initial ignition (S140).

Thereafter, if the fuel gradually decreases or the fire becomes unstable due to the continuous combustion operation, the microcomputer 130 determines whether an error occurs (for example, whether the value of 100 ms is inputted more than three times for 5 seconds) by continuously checking the voltage value inputted through the resistor R4 and the photocell P/C, and if it is determined that the error occurs, the microcomputer 130 enters into an error-1 mode due to the incomplete combustion (S150).

If it is determined that the initial ignition or the continuous combustion operation is normal, the microcomputer determines whether an error occurs (whether the temperature of the burner is higher than the maximum temperature of the burner by more than 30° C.) by sensing the internal temperature Tb of the burner 30, which rises corresponding to the combustion operation of the burner 30, through another temperature sensing unit, and if it is determined that the error occurs, the microcomputer 130 enters into an error-4 mode due to the overheat of the burner 30 (S160 to S170).

If it is determined that the temperature Tb of the burner 30 is normal, the combustion is performed in the burner 30, and the heated air is compulsorily ventilated by the driving of the fan motor 61 to rise the indoor temperature. At this time, the temperature sensing unit 90 senses the rising indoor temperature Tr through the thermistor RTH, and outputs the sensed indoor temperature to the microcomputer 130 (S180).

The microcomputer 130 determines whether the indoor temperature Tr inputted from the temperature sensing unit 90 is higher than the set temperature Ts by more than a predetermined value $T^2$ (for example, +1° C.) by comparing the indoor temperature Tr with the set temperature Ts (S190).

If it is determined that the indoor temperature Tr inputted from the temperature sensing unit 90 is not higher than the set temperature Ts by more than the predetermined value $T^2$ (for example, +1° C.), the microcomputer 130 returns to step S180 and repeatedly performs the steps following step S180 as it continuously senses the indoor temperature Tr.

Meanwhile, if it is determined that the indoor temperature Tr is higher than the set temperature Ts by more than the value $T^2$ (for example, +1° C.), the microcomputer 130 outputs the control signal to the solenoid valve driving unit 40 to stop the combustion operation of the heater.

The low-level control signal outputted from the microcomputer 130 is applied to the transistor TR3 of the solenoid valve driving unit 40 to turn off the transistor TR3, and this causes the relay RY3 to be turned off.

If the relay RY3 is turned off, the AC power supplied to the solenoid valve 41 is intercepted to turn off the solenoid valve 41, and thus the supply of the fuel into the burner 30 is intercepted (S200).

Meanwhile, the low-level-control signal outputted from the microcomputer 130 is applied to the transistor TR1 of the motor driving unit 60 to turn off the transistor TR1, and this causes the relay RY1 to be turned off.

If the relay RY1 is turned off, the AC power supplied to the fan motor 61 through the relay RY1 is intercepted to turn off (e.g., stop) the fan motor 61 (S210).

Thereafter, the microcomputer 130 outputs the control signal to the igniter driving unit 50 to stop the ignition operation of the burner 30.

The low-level control signal outputted from the microcomputer 130 is applied to the transistor TR2 of the igniter driving unit 50 to turn off the transistor TR2, and this causes the relay RY2 to be turned off.

If the relay RY2 is turned off, the AC power supplied to the igniter 51 is intercepted to turn off the igniter 51, and thus the supply of the AC power to the igniter 51 through the relay RY2 is intercepted (S220).

As described above, the solenoid valve 41, the fan motor 61 and the igniter 51 are sequentially turned off, and thus the combustion operation of the heater is stopped. Accordingly, the indoor temperature drops again, and the microcomputer 130 returns to step S40 and repeatedly performs the steps following step S40.

Accordingly, the microcomputer 130 checks whether the indoor temperature Tr inputted from the temperature sensing unit 90 drops below the set temperature Ts or the set temperature Ts is changed by the user, and if it is checked that the indoor temperature Tr drops below the set temperature Ts, the microcomputer 130 drives again the igniter 51, the solenoid valve 41 and the fan motor 61, and the indoor temperature rises again.

At this time, in order to prevent the load of the heater composed of the igniter, solenoid valve and fan motor from being frequently turned on/off, the microcomputer 130 sets an operation condition of the heater so that the heater is turned on if the indoor temperature is lower than the set temperature by more than 2° C. and turned off if the indoor temperature is higher than the set temperature by more than 1° C.

As described above, the temperature control apparatus according to the present invention can remove the error (about 20%) that occurs in the conventional analog type temperature setting unit using a variable resistor and can continuously maintain the temperature set by the user through an accurate temperature control by receiving the user's set temperature through the encoder switch as a digital signal, comparing the indoor temperature inputted in real time with the set temperature, and turning on/off the burner according to the result of comparison.

Next, in the temperature control method for a heater according to the present invention, error mode processing methods performed due to the failure of the initial ignition or the incomplete combustion will be explained.

Figure 4:
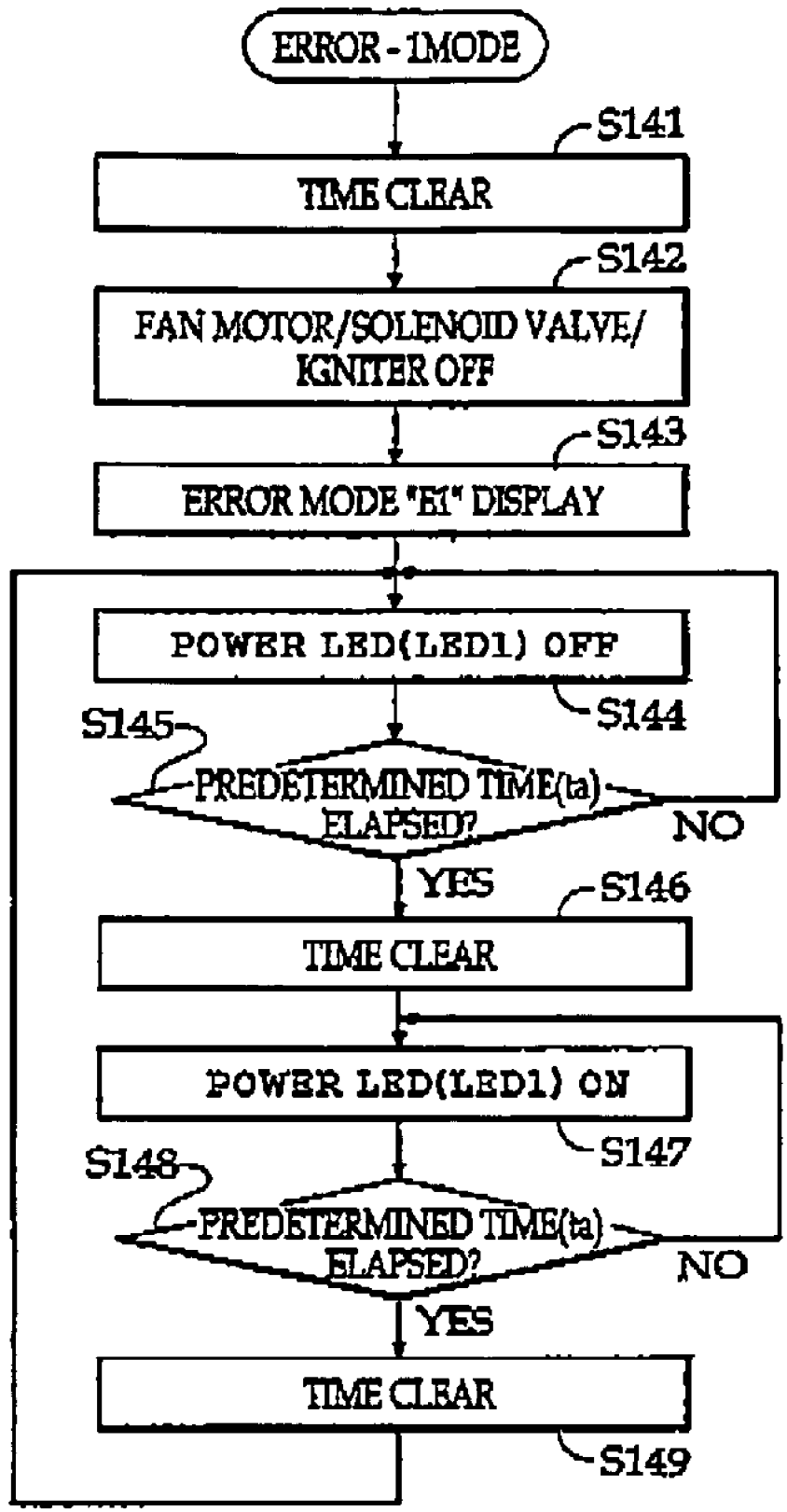
FIG. 4 is a flowchart illustrating a process of an ignition error mode in the temperature control method according to the present invention.

FIG. 4 is a flowchart illustrating the process of an ignition error mode in the temperature control method according to the present invention.

If an error occurs during the initial ignition or the continuous combustion operation, the microcomputer 130 enters into an error-1 mode to clear time, and turns off the solenoid valve 41, the igniter 51 and the fan motor 61 by controlling the solenoid valve driving unit 40, the igniter driving unit 50 and the motor driving unit 60 (S141 and S142)

Then, the microcomputer 130 enables the user to confirm what error occurs in the heater by displaying the character "E1" through the temperature display unit 100 for displaying the present temperature, and thus makes it possible for the user to promptly cope with the error occurrence due to the failure of the initial ignition or the incomplete combustion (S143).

Then, the microcomputer 130 turns off the power LED LED1 that displays the ignition state of the heater by outputting the control signal for flickering the power LED LED1 to the ignition state display unit 80 (S144).

Thereafter, the microcomputer 130 determines whether a predetermined time ta (for example, about 1 second) elapses by counting an off time of the power LED LED1, and if the predetermined time ta elapses, the microcomputer 130 clears a time counter, and then turns on the power LED LED1 by controlling the ignition state display unit 80 (S145 to S147).

The microcomputer 130 determines whether the predetermined time ta elapses by counting an on time of the power LED LED1, and if the predetermined time ta elapses, the microcomputer 130 clears the time counter again (S148 and S149), and then returns to step S144 to repeatedly perform the steps following step S144.

Consequently, the microcomputer 130 displays the error mode of "E1" through the temperature display unit 100, and simultaneously enables the user to promptly confirm the ignition error state by flickering the power LED LED1 at predetermined intervals ta (for example, about 1 second).

Next, in the temperature control method for a heater according to the present invention, an error mode processing method performed due to the inferiority of the thermistor will be explained.

Figure 5:
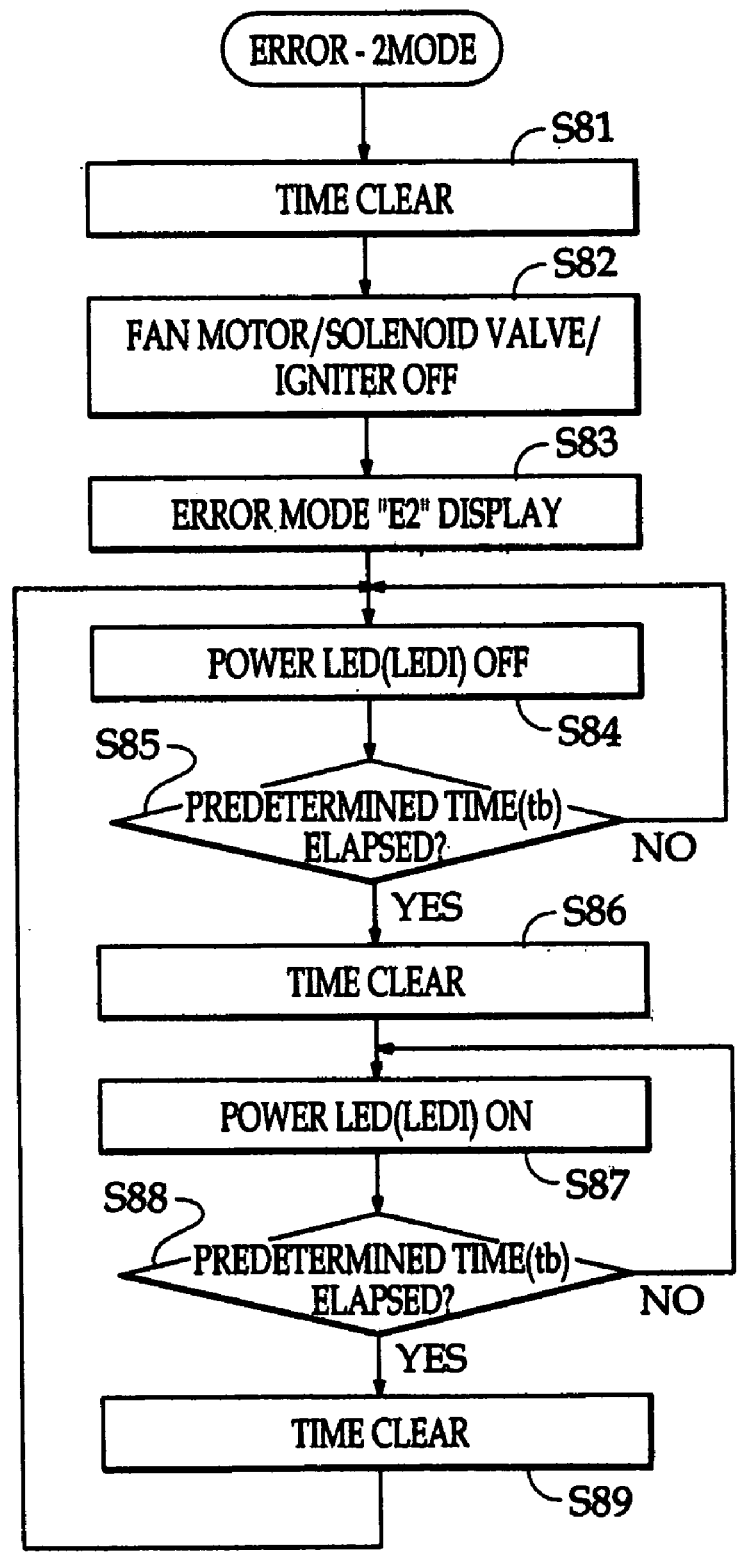
FIG. 5 is a flowchart illustrating a process of a thermistor error mode in the temperature control method according to the present invention.

FIG. 5 is a flowchart illustrating the process of a thermistor error mode in the temperature control method according to the present invention.

If an error occurs in the thermistor, the microcomputer 130 enters into an error-2 mode to clear time, and turns off the solenoid valve 41, the igniter 51 and the fan motor 61 by controlling the solenoid valve driving unit 40, the igniter driving unit 50 and the motor driving unit 60 (S81 and S82).

Then, the microcomputer 130 enables the user to confirm what error occurs in the heater by displaying the character "E2" through the temperature display unit 100 for displaying the present temperature (S83).

Then, the microcomputer 130 turns off the power LED LED1 that displays the ignition state of the heater by outputting the control signal for flickering the power LED LED1 to the ignition state display unit 80 (S84).

Thereafter, the microcomputer 130 determines whether a predetermined time tb (for example, about 0.5 second) elapses by counting an off time of the power LED LED1, and if the predetermined time tb elapses, the microcomputer 130 clears a time counter, and then turns on the power LED LED1 by controlling the ignition state display unit 80 (S85 to S87).

The microcomputer 130 determines whether the predetermined time tb elapses by counting an on time of the power LED LED1, and if the predetermined time tb elapses, the microcomputer 130 clears the time counter again (S88 to S89), and then returns to step S84 to repeatedly perform the steps following step S84.

Consequently, the microcomputer 130 displays the error mode of "E2" through the temperature display unit 100, and simultaneously enables the user to promptly confirm the thermistor error state by flickering the power LED LED1 at predetermined intervals tb (for example, about 0.5 second).

Next, in the temperature control method for a heater according to the present invention, an error mode processing method performed due to the inferiority of the encoder switch will be explained.

Figure 6:
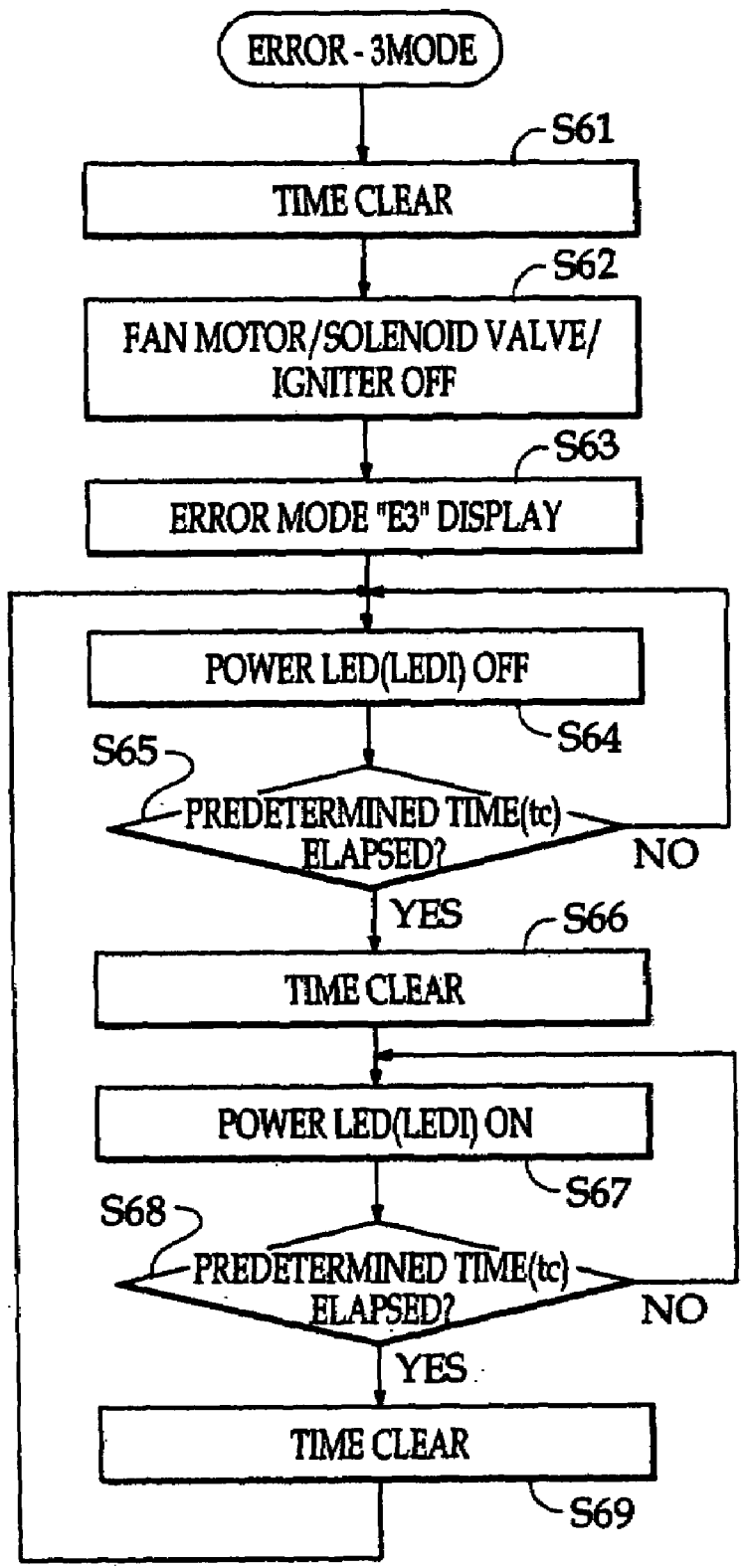
FIG. 6 is a flowchart illustrating a process of an encoder switch error mode in the temperature control method according to the present invention.

FIG. 6 is a flowchart illustrating a process of an encoder switch error mode in the temperature control method according to the present invention.

If an error occurs in the encoder switch 21, the microcomputer 130 enters into an error-3 mode to clear time, and turns off the solenoid valve 41, the igniter 51 and the fan motor 61 by controlling the solenoid valve driving unit 40, the igniter driving unit 50 and the motor driving unit 60 (S61 and S62)

Then, the microcomputer 130 enables the user to confirm what error occurs in the heater by displaying the character "E3" through the temperature display unit 100 for displaying the present temperature (S63).

Then, the microcomputer 130 turns off the power LED LED1 that displays the ignition state of the heater by outputting the control signal for flickering the power LED LED1 to the ignition state display unit 80 (S64).

Thereafter, the microcomputer 130 determines whether a predetermined time tc (for example, about 0.7 second) elapses by counting an off time of the power LED LED1, and if the predetermined time tc elapses, the microcomputer 130 clears a time counter, and then turns on the power LED LED1 by controlling the ignition state display unit 80 (S65 to S67).

The microcomputer 130 determines whether the predetermined time tc elapses by counting an on time of the power LED LED1, and if the predetermined time tc elapses, the microcomputer 130 clears the time counter again (S68 to S69), and then returns to step S64 to repeatedly perform the steps following step S64.

Consequently, the microcomputer 130 displays the error mode of "E3" through the temperature display unit 100, and simultaneously enables the user to promptly confirm the error state of the encoder switch 21 by flickering the power LED LED1 at predetermined intervals tc (for example, about 0.7 second).

In the embodiment of the present invention, the microcomputer 130 sets the time tc to about 0.7 second. However, the present invention is not limited thereto, but the time tc may be set to 0.5 second or 0.7 second like the set time ta or tb.

Next, in the temperature control method for a heater according to the present invention, an error mode processing method performed due to overheat of the burner will be explained.

Figure 7:
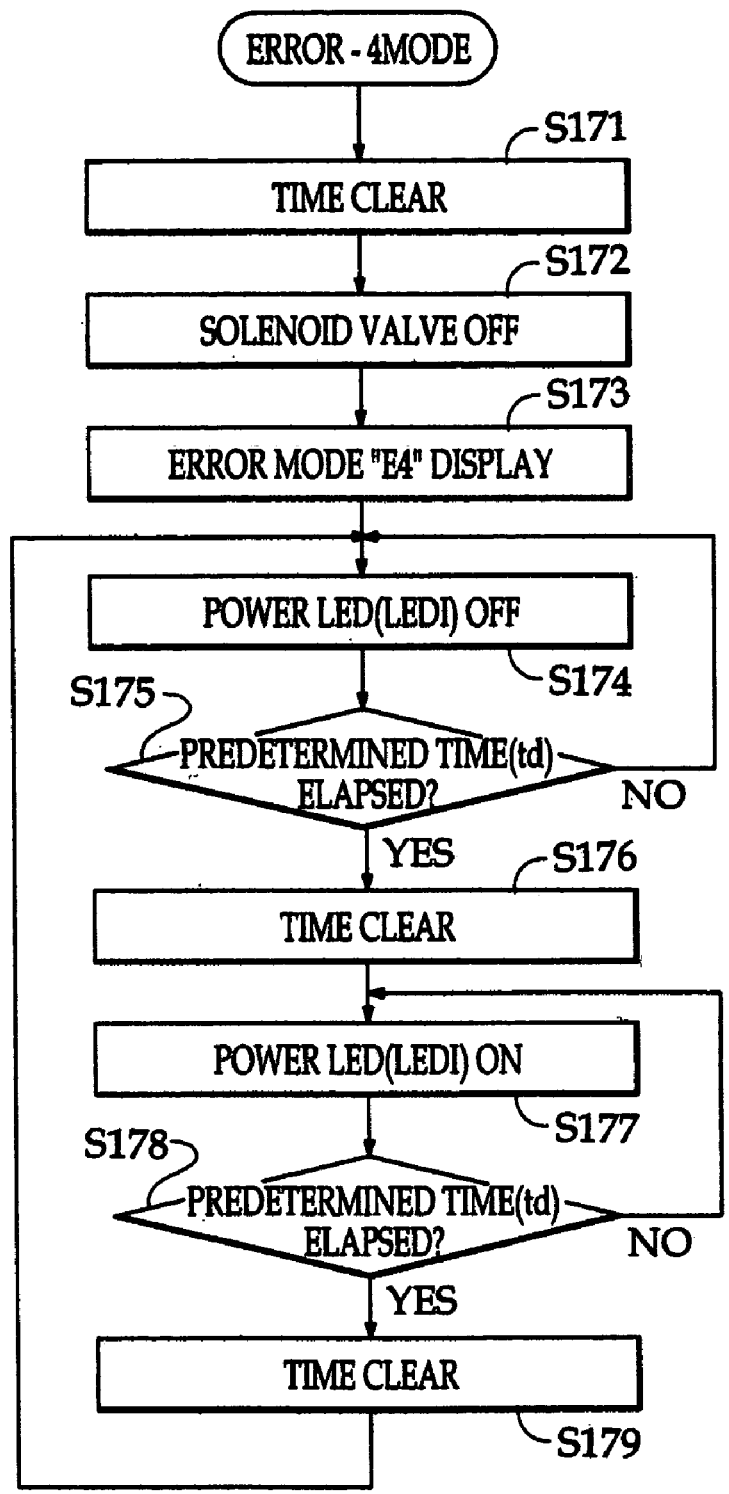
FIG. 7 is a flowchart illustrating a process of a burner error mode in the temperature control method according to the present invention.

FIG. 7 is a flowchart illustrating a process of a burner error mode in the temperature control method according to the present invention.

If an error occurs in the burner 30, the microcomputer 130 enters into an error-4 mode to clear time, and turns off the solenoid valve 41 by controlling the solenoid valve driving unit 40 (S171 and S172)

Then, the microcomputer 130 enables the user to confirm what error occurs in the heater by displaying the character "E4" through the temperature display unit 100 for displaying the present temperature (S173).

Then, the microcomputer 130 turns off the power LED LED1 that displays the ignition state of the heater by outputting the control signal for flickering the power LED LED1 to the ignition state display unit 80 (S174).

Thereafter, the microcomputer 130 determines whether a predetermined time td (for example, about 0.8 second) elapses by counting an off time of the power LED LED1, and if the predetermined time td elapses, the microcomputer 130 clears a time counter, and then turns on the power LED LED1 by controlling the ignition state display unit 80 (S175 to S177).

The microcomputer 130 determines whether the predetermined time td elapses by counting an on time of the power LED LED1, and if the predetermined time td elapses, the microcomputer 130 clears the time counter again (S178 to S179), and then returns to step S174 to repeatedly perform the steps following step S174.

Consequently, the microcomputer 130 displays the error mode of "E4" through the temperature display unit 100, and simultaneously enables the user to promptly confirm the error state of the burner 30 by flickering the power LED LED1 at predetermined intervals td (for example, about 0.8 second).

In the embodiment of the present invention, the microcomputer 130 sets the time td to about 0.8 second. However, the present invention is not limited thereto, but the time td may be set to 0.5 second, 1 second or 0.7 second like the set time ta, tb or tc.

Meanwhile, in the embodiment of the present invention, the processes of checking error modes in the case of the error occurrence due to the failure of the initial ignition of the burner 30, the error occurrence due to the incomplete combustion occurring during the combustion operation of the burner 30, the error occurrence in the thermistor, the error occurrence in the encoder switch, and the error occurrence due to the overheat of the burner 30 have been explained in order for the sake of convenience in explanation. However, the present invention is not limited thereto, but it is apparent that the microcomputer 130 continuously checks the error modes.

As described above, according to the temperature control apparatus for a heater using an encoder switch and the method thereof according to the present invention, the indoor temperature can uniformly be maintained by receiving a user's set temperature through the encoder switch as a digital signal, comparing an indoor temperature inputted in real time with the set temperature, and repeating an on/off operation of the burner according to the result of comparison.

Also, the present invention can prevent the heater from being frequently turned on/off and thus protect the system by setting an operation condition of the heater so that the heater is turned on if the indoor temperature is lower than the set temperature by less than −2° C., and is turned off if the indoor temperature is higher than the set temperature by more than 1° C.

Also, the present invention can display the indoor temperature and an abnormal operation mode (e.g., error mode) during the operation of the heater through a temperature display unit, and makes it possible for the user to accurately and promptly cope with the error in accordance with the kind of error by classifying and displaying the kind of error during the operation of the heater.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A temperature control apparatus for a heater using an encoder switch that controls an indoor temperature by driving a burner in accordance with a change of the indoor temperature and ventilating heated air indoors, the apparatus comprising:
   (a) an encoder switch for converting a user's set temperature value into a digital signal of a predetermined number of bits;
   (b) a microcomputer for comparing the indoor temperature inputted in real time with the user's set temperature, the microcomputer operative to drive the burner if the indoor temperature is lower than the set temperature by more than a predetermined temperature $T_1$, and stop the driving of the burner if the indoor temperature is higher than the set temperature by more than a predetermined temperature $T_2$;
   (c) a display unit for checking and displaying various kinds of error modes occurring while the burner is driven in accordance with a control signal inputted from the microcomputer,
   (d) a temperature display selection unit for selectively displaying the indoor temperature displayed through the temperature display unit by Celsius (C) or Fahrenheit (F);
   (e) a fire sensing unit for sensing an ignition state of the burner by sensing a fire sensitivity in the burner;
   (f) a thermistor for sensing the indoor temperature changed in real time;
   (g) a temperature sensing unit for sensing a temperature of the burner that rises according to a combustion operation of the burner;
   wherein the display unit comprises:
      (i) a temperature display unit for displaying the indoor temperature inputted in real time in accordance with the control signal from the microcomputer, and
      (ii) an ignition state display unit for displaying a ignition state of the burner through a power LED in accordance with the control signal from the microcomputer;
   wherein the microcomputer checks:
      (A) the various kinds of error modes occurring while the burner is driven, and if an error occurs, the microcomputer displays the error mode by flickering the power LED at predetermined intervals;

(B) error modes occurring due to a failure of an initial ignition of the burner and an incomplete combustion of the burner by checking a voltage value inputted from the fire sensing unit1
(C) an error mode occurring due to disconnection of the thermistor by checking a voltage value inputted from the thermistor; and
(D) an error occurring due to overheat of the burner by checking a voltage value inputted from the temperature sensing unit.

2. The temperature control apparatus in accordance with claim 1, wherein the microcomputer determines the incomplete combustion if a value of a voltage inputted from the fire sensing unit is inputted three times or more as a value of 100 ms for a predetermined time, and the predetermined time is 5 seconds.

* * * * *